United States Patent
Edelen et al.

(10) Patent No.: US 7,992,952 B2
(45) Date of Patent: Aug. 9, 2011

(54) ENHANCED COMMUNICATIONS PROTOCOL FOR IMPROVED MODULARITY IN A MICRO-FLUID EJECTION DEVICE

(75) Inventors: John Glenn Edelen, Versailles, KY (US); Carson A. Fischer, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 849 days.

(21) Appl. No.: 11/760,961

(22) Filed: Jun. 11, 2007

(65) Prior Publication Data

US 2008/0303849 A1    Dec. 11, 2008

(51) Int. Cl.
B41J 29/38        (2006.01)
(52) U.S. Cl. .................... 347/9; 347/5; 347/12
(58) Field of Classification Search .............. 347/5, 9, 347/12–15, 19
See application file for complete search history.

(56) References Cited

U.S. PATENT DOCUMENTS

| | | |
|---|---|---|
| 6,493,106 B1 | 12/2002 | Gauthier et al. |
| 6,705,694 B1 | 3/2004 | Barbour et al. |
| 7,019,866 B1 | 3/2006 | Beck et al. |
| 7,159,959 B2 | 1/2007 | Schremp |
| 2002/0191038 A1 | 12/2002 | Tsuji |
| 2005/0212831 A1 | 9/2005 | Graf et al. |
| 2007/0046701 A1 | 3/2007 | Kondoh |

*Primary Examiner* — Lam S Nguyen

(57) ABSTRACT

Methods and apparatus for improving modularity in a micro-fluid ejection device and for providing instruction data to a plurality of data handling devices within a micro-fluid ejection device. The method includes generating device data and appending an address to the device data to generate instruction data. The address typically indicates at least one data handling device within the micro-fluid ejection device for which the device data is intended. The instruction data is provided to a plurality of data handling devices including at least one data controller. The data controller is operated to decode the address from the instruction data and select at least one data handling device to receive the device data based upon the decoded address. The device data is thereby input into each selected data handling device and subsequently used to operate the micro-fluid ejection device.

11 Claims, 6 Drawing Sheets

US 7,992,952 B2

ENHANCED COMMUNICATIONS PROTOCOL FOR IMPROVED MODULARITY IN A MICRO-FLUID EJECTION DEVICE

TECHNICAL FIELD

This invention generally relates to systems and methods for enhancing the communication protocol in a micro-fluid ejection device. More specifically, one embodiment relates to systems and methods for implementing a data controller within a micro-fluid ejection device to improve the modularity of the device.

BACKGROUND

Traditionally in a micro-fluid ejection device, the transmission of instruction data through the device is understood. Instruction data is provided to various registers, and is latched to the registers with a "load" signal from an application specific integrated circuit ("ASIC"). The instruction data, previously supplied by the load signal, is activated when the ASIC initiates a "fire" signal. Such data transmission and coordination with the ASIC operates a micro-fluid ejection device to print an object on a medium.

Additional functionality, such as memory reads/writes, test operations and output data control selection are being added to micro-fluid ejection devices to improve functionality. However, to be compatible with the existing design and architecture of current micro-fluid ejection devices, data transmission methods and devices must he altered. As a result, implementation of such additional functionality has resulted in increased complexity, higher cost and lengthy data transmissions. For instance, previously simple control signals from the ASIC such as "fire" and "load" require special sequences and timings to properly execute additional functionality. Additionally, extra logic is required to support the various functions thereby occupying large portions of valuable silicon area. For example, internal registers and control signals "fire" and "load" must be expanded to support a memory function or other function that is added to a device. These drawbacks hinder the possibility of increasing the functionality of a micro-fluid ejection device.

Accordingly, there is a need to improve the modularity of a micro-fluid ejection device without increasing device and transmission complexity.

SUMMARY

According to one embodiment, a method for improving modularity in a micro-fluid ejection device is provided. The method comprises generating device data; appending an address to the device data to generate instruction data, the address indicating at least one data handling device within the micro-fluid ejection device for which the device data is intended; providing the instruction data to a plurality of data handling devices including at least one data controller; operating at least one data controller to: decode the address from the instruction data and select at least one data handling device to receive the device data based upon the decoded address; and inputting the device data into each selected data handling device.

According to another embodiment, a method for providing instruction data to a plurality of data handling devices within a micro-fluid ejection device is provided. The method comprises receiving instruction data, wherein the instruction data comprises address data and device data; separating the address data from the device data; decoding address data, wherein the decoded address data assigns the instruction data to at least one data handling device; separating error data from the instruction data; transmitting an error signal to at least one addressed data handling device to indicate erroneous instruction data and enabling a signal to the at least one addressed data handling device, wherein the signal is operative to input device data to the addressed data handling device.

According to yet another embodiment a micro-fluid ejection device configured for ejecting one or more ink droplets to an object is provided. The device comprises a power circuit; at least one heater element for ejecting the one or more ink droplets to an object; an integrated circuit operative to generate instruction data and a control circuit comprising: a plurality of addressable data handling devices communicatively connected to the integrated circuit such that instruction data is provided to each connected data handling device and at least one data controller operative to decode an address from the instruction data and select at least one data handling device based upon the decoded address to receive device data from the instruction data.

BRIEF DESCRIPTION OF THE DRAWINGS

It is believed that the present invention will be better understood from the following description taken in conjunction with the accompanying drawings in which.

Figure 1:
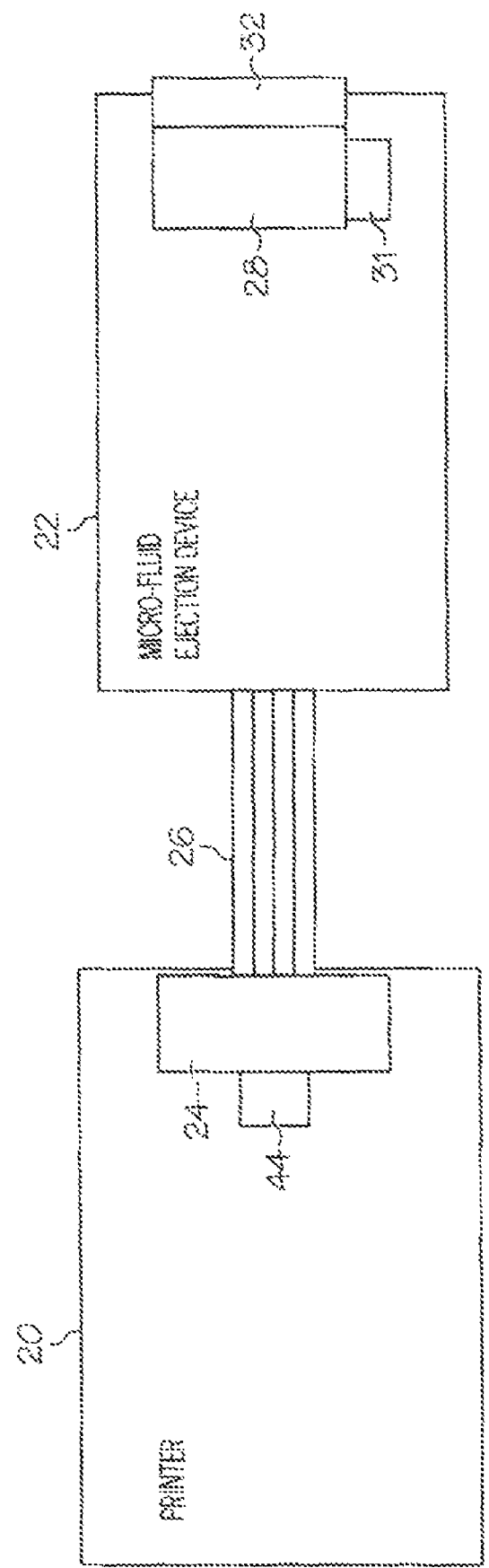
FIG. 1 is a block diagram of a main printer assembly and micro-fluid ejection device in accordance with one illustrative embodiment of the present invention.

The embodiments set forth in the drawings are illustrative in nature and are not intended to be limiting of the invention defined by the claims. Moreover, individual aspects of the drawings and the invention will be more fully apparent and understood in view of the detailed description.

DETAILED DESCRIPTION OF ILLUSTRATIVE EMBODIMENTS

Referring to the drawing figures in detail, FIG. 1 illustrates a printer assembly 20 and micro-fluid ejection device 22 according to one embodiment of the present invention. In one exemplary embodiment, the printer assembly 20 represents the main body of an ink jet printer and may include a media carrier, a micro-fluid ejection device carrier, a housing, a power supply, interconnections for external devices, and an electronics module 24 that may connect to external devices and may also connect to the micro-fluid ejection device 22 through a tab circuit 26. The micro-fluid ejection device 22 includes a power circuit 28 that may be formed on one or more integrated circuits or chips. The power circuit 28 is connected to and provides the energy necessary to operate a control circuit 32 and/or a plurality of heater primitives 31. In some embodiments, the control circuit 32 and heater primitives 31 may be built into or integrated into the same chip as the power circuit 28. In yet other embodiments, the control circuit 32 and heater primitives 31 may be built onto separate chips and connected to the power circuit 28 via auxiliary bussing. The control circuit 32 is connected to heater primitives 31 for selectively applying current to the heater primitives 31 to eject fluid onto media. In one embodiment, heater primitives 31 comprise a plurality of heater elements which may be selectively operated by control circuit 32 as is common in micro-fluid ejection devices.

Figure 2:
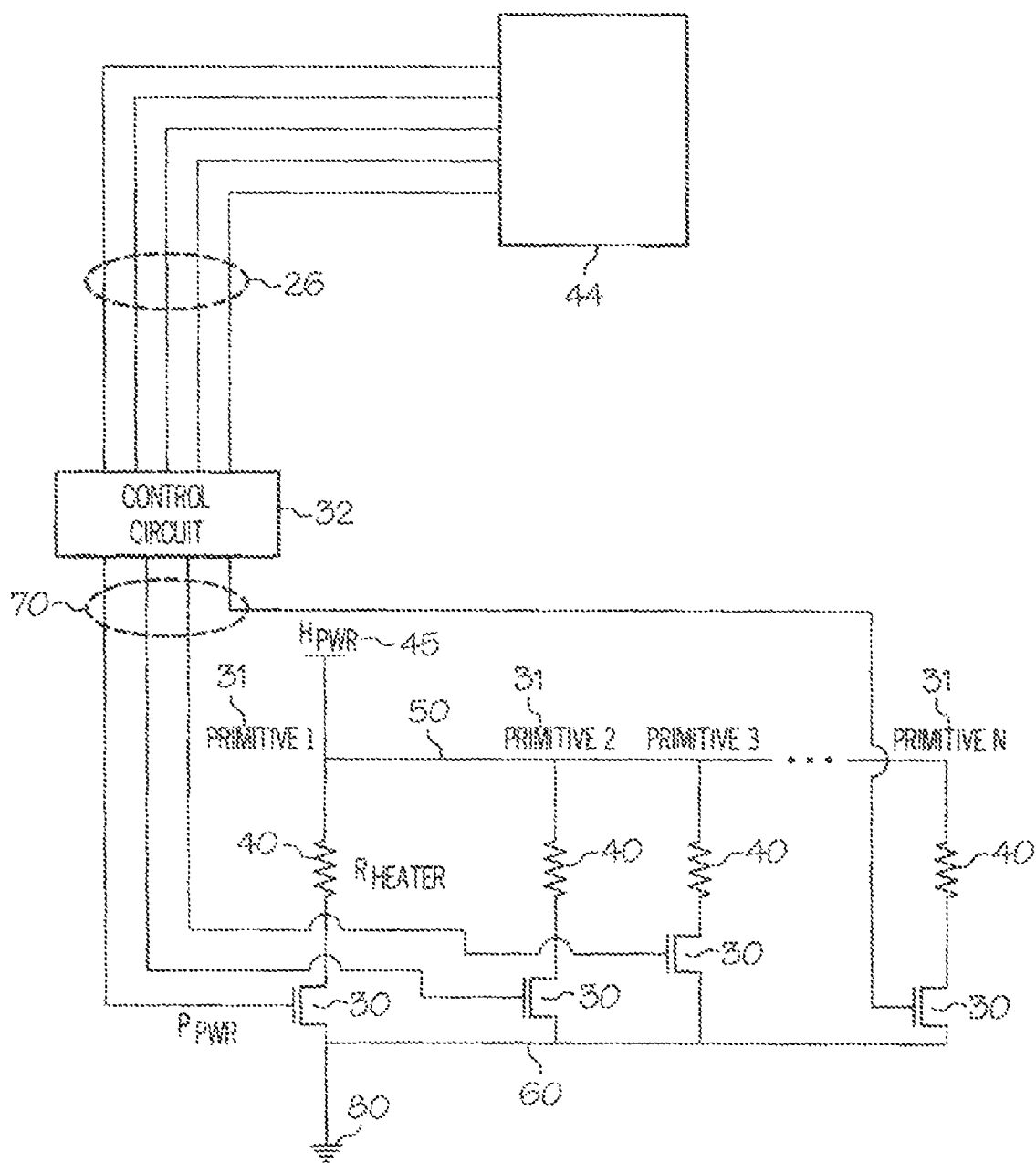
FIG. 2 is a schematic diagram illustrating the operation of the micro-fluid ejection device, control circuit, power circuit, and power logic switches.

Referring now to FIG. 2, schematic details of the micro-fluid ejection device 22 are shown. As illustrated in one embodiment, the heating elements 40 are connected to a power line 50 to provide power to each heating element 40. The heating elements 40 are coupled to associated logic switches 30 which are connected to a ground line 60. As is common, power line 50 and ground line 60 may be coupled to power circuit 28 on FIG. 1 to provide power to the heating elements 40. The control circuit 32 may be connected to the logic switches 30 to selectively control the operation of heating elements 40. As is described more fully below, the control circuit 32 applies a signal to logic switch 30 to allow current to pass through the particular heating element 40 connected between the power line 50 and ground line 60. Logic switch 30 may be any transistor such as a BJT, a p-channel MOSFET, a n-channel MOSFET or the like. Although only four heating elements 40, primitives 31 and logic switches 30 are illustrated, the schematic diagram illustrated in FIG. 2 is intended to illustrate an ink jet printer having any number of heating elements 40, primitives 31 and logic switches 30. Accordingly, the last heater element 40, primitive 31 and logic switch 30 in the circuit is designated with 'N' to illustrate that any number of heater elements 40, primitives 31 and logic switches 30 may be used according to a particular embodiment or design. Additionally, it should be understood that the heater elements 40 associated with each primitive 31 in FIG. 2 are merely illustrative of one heater element 40 selected within the primitive 31. A plurality of heater elements are provided within each primitive, are connected to power line 50 and ground line 60 and are selected by applying a signal to the logic switch 30 associated with the selected heater element.

Still referring to FIG. 2, control circuit 32 may be communicatively connected to an integrated circuit 44. Integrated circuit 44 may be operable to translate a printable item (i.e., an image, a printable transistor or any other item capable of being printed by ink droplets) into a carrier signal to provide instructions (i.e. instruction data) to the control circuit 32 to print the item onto corresponding media. Instruction data may be any data provided to the micro-fluid ejection device such as print data, output, control data, memory data, temperature sensor data, test data, analog trim data or the like. Accordingly, instruction data may be transmitted in data packets, data segments, individualized bits or according to any other data transmission packaging method now known or hereafter developed. The control circuit 32 provides a signal to particular logic switches 30 based upon the instruction data in order to provide current to beater elements 40. Such current heats the heating element 40 and ejects ink droplets to an object (i.e., paper or other printable media) provided adjacent to the micro-fluid ejection device. The particular pattern and/or order of firing of the logic switches 30 and heater elements 40 depends upon the instruction data provided from integrated circuit 44. In one exemplary embodiment, the instruction data will produce an image on the object corresponding to the printable item. The integrated circuit 44 may be included on printer 20 to transmit such data from the tab circuit 26 to the control circuit 32 as shown in FIGS. 1 & 2. Integrated circuit 44 may be any device capable of providing instructions that correspond to an image, such as a microprocessor, art application specific integrated circuit (ASIC) or the like. Accordingly, integrated circuit 44 may structure the data signal based upon the particular device design, instruction set or other parameter for operating a device.

Figure 3:
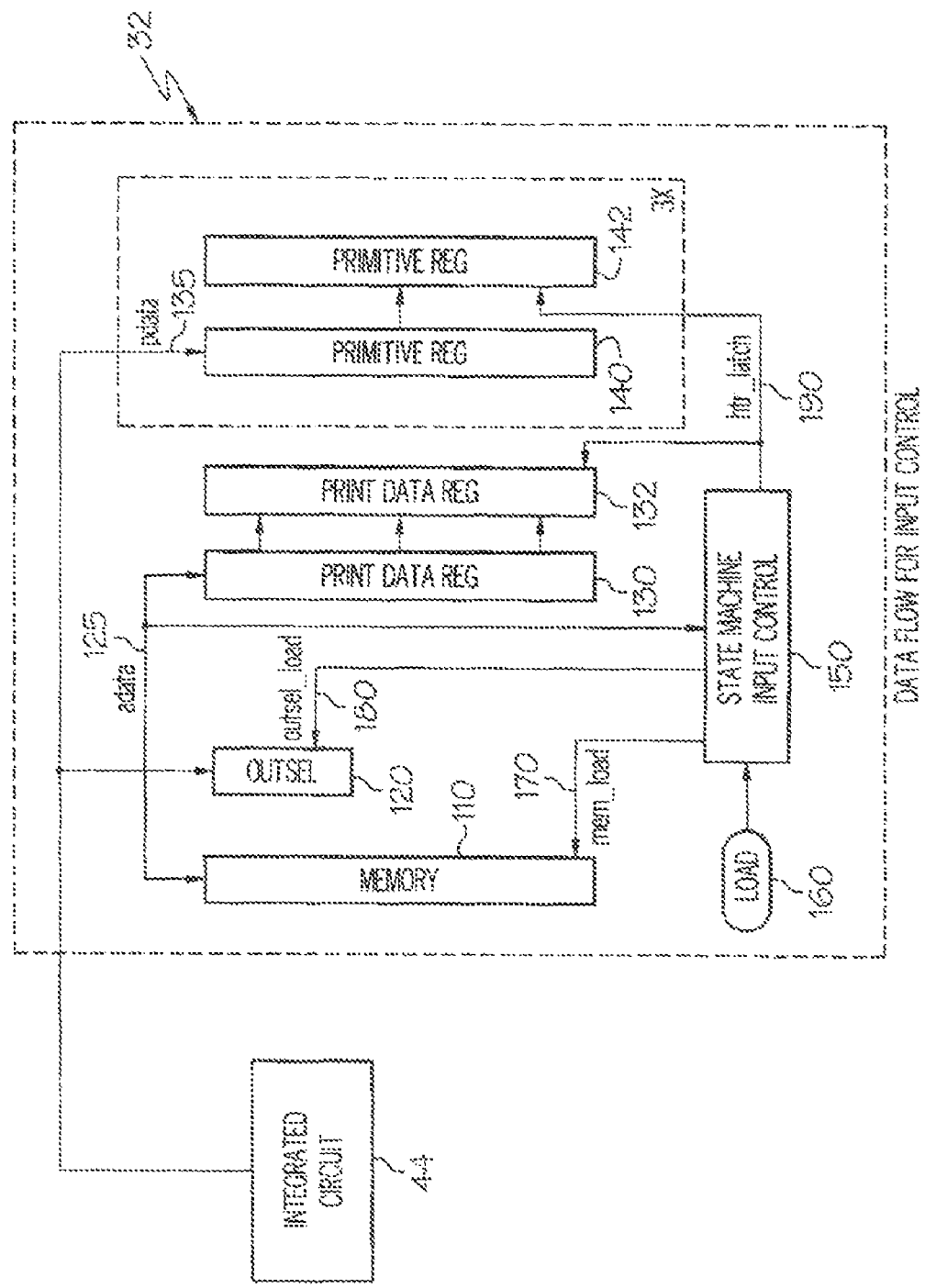
FIG. 3 is a schematic view of a control circuit operating in accordance with one illustrative embodiment of the present invention.

As illustrated in FIG. 3, control circuit 32 may comprise data handling devices (such as memory 110, OUTSEL 120, instruction data registers 130 and 132, primitive data register 140 and primitive heater register 142) and at least one data controller 150. Instruction data may be received by the data controller 150 and routed to the data handling devices, as will be described in more detail below. The data handling devices, alone or in combination with each other, may provide various functionality to the micro-fluid ejection device. For instance, memory 110 may be operable to store data for identification, manufacturing or the like. OUTSEL 120 may be operable to control the output of particular data handling devices. Additionally, registers 130, 132, 140 and 142 may be operable to store and 'latch' instruction data, as is common. Additional data handling devices may be included to provide additional functionality within a micro-fluid ejection device such as reset logic, no-operational (i.e., NO-OP) logic or the like.

As illustrated, the data handling devices and data controller 150 may be communicatively connected to data lines for receiving instruction data from integrated circuit 44. In one embodiment, data line 'adata' 125 may be communicatively connected to memory 110, OUTSEL 120, and instruction data register 130. In another embodiment, data line 'pdata' 135 may be communicatively connected to primitive data register 140. However, other connection schemes may be provided to configure to particular data flow configurations and corresponding logic devices such as connecting 'adata' 125 to instruction data register 132 and/or connecting primitive heater register 142 to 'pdata' 135.

Data lines 125 and 135 may provide data according to data transmission methods commonly known in the art or hereafter developed. In one embodiment, data lines 125 and 135 may comprise an individual line such that data may be provided serially to a coupled device. In such an embodiment, data is loaded into the coupled device sequentially such that a word (i.e., multiple bits of information sequentially organized) is ultimately loaded into the device as sequential bits. Such serial communication lines may occupy minimal silicon space when additional data handling devices are added to a control circuit 32 since a single conductor trace provides connectivity. In another embodiment, data lines 125 and 135 may comprise a bus such that multiple bits of data may be simultaneously provided to a coupled device. In such an embodiment, a word of data may be simultaneously loaded into the device.

Still referring to FIG. 3, a 'load' signal 160 may be provided to indicate when particular data handling devices are to input data, as is common. The 'load' signal 160, as illustrated, is provided from integrated circuit 44 in accordance with printing the printable item. However, other 'load' signals may be provided using other devices now known or hereafter developed.

Still referring to FIG. 3, a control circuit 32 may comprise a data controller 150 to control the flow of data to and improve the modularity of the data handling devices as will be described in more detail below. Data controller 150 may be communicatively connected to a data line for receiving data from integrated circuit 44. In the illustrative embodiment, data controller 150 may be communicatively connected to the data line 'adata' 125 to receive instruction data from integrated circuit 44. However, in other embodiments, data controller 150 may be communicatively connected to other data lines and may receive other data in accordance with the design or format of the data communicated. Additionally, data controller 150 may be communicatively connected (i.e., 'mem_load' 170, 'outsel_load' 180 and 'htr_latch' 190) to at least one data handling device to control the device and/or provide data to the device. In other embodiments, data controller 150 may be communicatively connected to various data handling devices implemented in a particular design or configuration.

As will be discussed in more detail, data controller 150 may receive instruction data provided to the micro-fluid ejection device (the same instruction data that is transmitted from integrated circuit 44 to the data handling devices) and may route such data to particular data handling devices based upon the instruction data. Accordingly, data controller 150 may be any device capable of receiving instruction data and controlling at least one particular data handling device based upon the data. In one embodiment, data controller 150 may be a state machine. In another embodiment, data controller 150 may be a sequential logic device. In yet another embodiment, data controller 150 may be a router.

Figure 4:
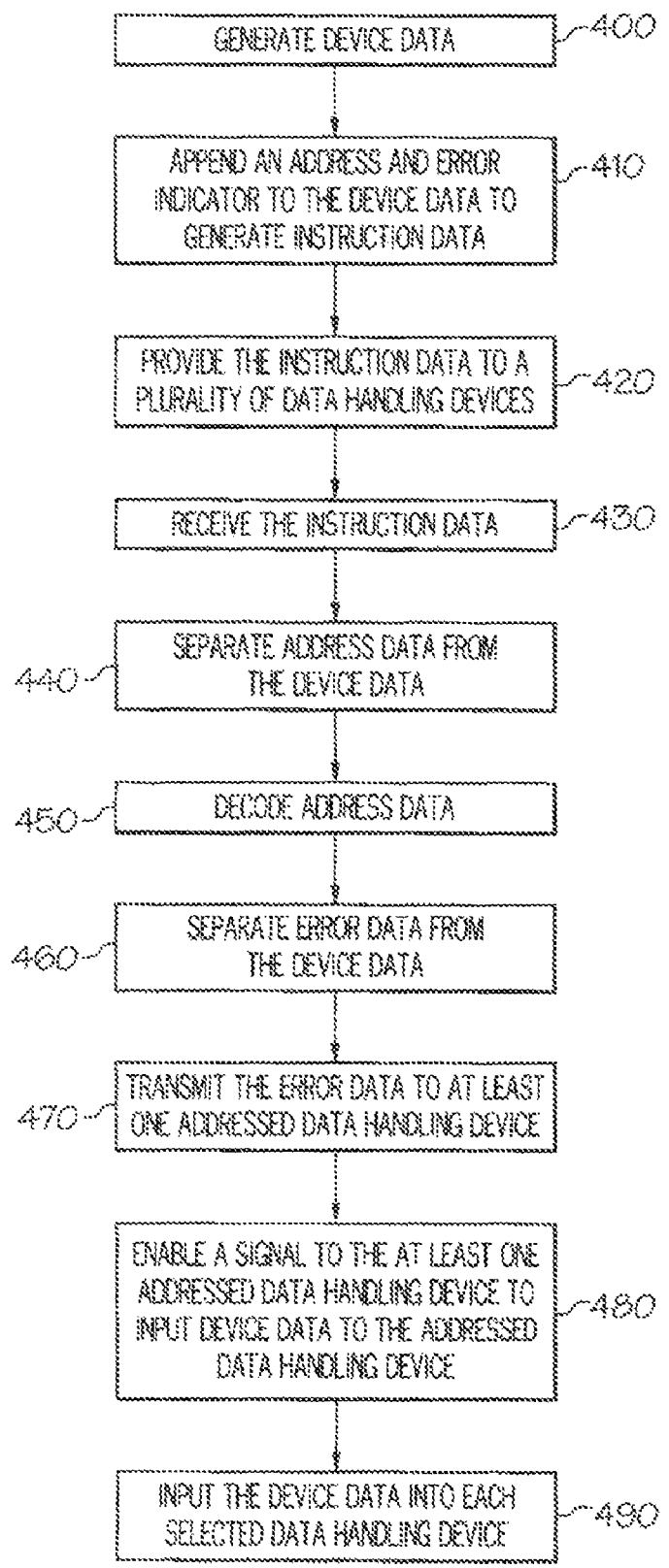
FIG. 4 is a flowchart depicting an example of a method for improving the modularity of data handling devices by controlling the instruction dam to the plurality of data handling devices, in accordance with one embodiment of the present invention.

Turning to FIG. 4, the operation of data controller 150 may be understood by focusing on the illustrated method for improving the modularity of data handling devices by controlling the instruction, data to the plurality of data handling devices in accordance with one particular embodiment of the present invention. As described above and illustrated in block 400, device data is generated to control heater elements 40 in creating an image from ink droplets. In one embodiment and as described above, integrated circuit 44 translates such data. As illustrated in block 410, an address is appended to the device data to generate instruction data. Typically, the address indicates the particular data handling device for which the device data is intended (i.e., device data for the memory 110 will be addressed for the memory 110). In another embodiment and as also illustrated in block 410, the instruction data may include an error indicator for the data controller 150 to evaluate the accuracy of the instruction data. As illustrated in block 420, the instruction date may be provided to a plurality of data handling devices including the at least one data controller 150.

As illustrated in block 430 of FIG. 4, and similar to the data handling devices, data controller 150 may receive the instruction data. As described above, data controller 150 may receive the data serially on one conductor or according to data communication methods now known or hereafter developed. As illustrated in block 440, data controller 150 may separate the address data from the device data. In one embodiment, the address data may be located at the beginning of the instruction data communicated to data controller 150. In such an embodiment, data controller 150 may sequentially receive the first group of bits designated as the address.

As illustrated in block 450, data controller 150 may decode the address data to determine the particular data handling device destination of the device data. In one embodiment, data controller 150 may decode the address with a multiplexer. In such an embodiment, addresses may correspond to individual output lines, each connected to a different data handling device, such that each address applies a signal to a different line. In yet other embodiments, data controller 150 may decode the address with any other sequential logic device.

As illustrated in block 460, data controller 150 may separate the error indicator from the device data. In one embodiment, the error indicator may be located between the address data and the device data and may be provided by the integrated circuit 44. In such an embodiment, data controller 150 may receive the error indicator to determine whether the instruction data is erroneous, as illustrated in block 470 and discussed further herein. If it is determined that the instruction data is erroneous, the data controller 150 may provide an error signal to at least one data handling device. According to the particular data handling device receiving the error signal, the erroneous instruction data may be ignored until accurate instruction data is transmitted to the data controller.

As illustrated in block 480, data controller 150 may transmit an enabling signal to at least one data handling device designated by the address. Such enabling signal loads device data into the data handling device. Consequently, the device data provided to the data handling device is received and input to the device, as illustrated in block 490. For instance, device data addressed for the memory 110 will be stored in memory 110 when an enabling signal is provided by data controller 150. Additionally, device data loaded into print registers 130 and 132 may be provided to the logic switches 40 to provide current through heater elements to eject ink droplets. Moreover, device data loaded into primitive register 140 and primitive heater register 142 may be provided to a group of primitives to activate particular primitives for heater element firing.

The address included in the instruction data improves the modularity of the data handling devices implemented in a control circuit 32. In particular, when a data handling device is added to a control circuit 32 employing a data controller 150, minor reconfigurations need only be made to integrate the particular data handling device into the control circuit 32. For instance, the new address of the device can simply he added to the data controller 150 to add the functionality of the data handling device thus eliminating a need for additional logic or reconfiguration of existing data handling devices. Additionally, serial data can be provided to the data handling devices since the instruction data which follows the address is provided to each data handling device and is only enabled to the addressed data handling device (i.e., by the data controller 150). Such serial communication is provided on a single serial line which saves silicon area on the micro-fluid ejection device.

Figure 5:
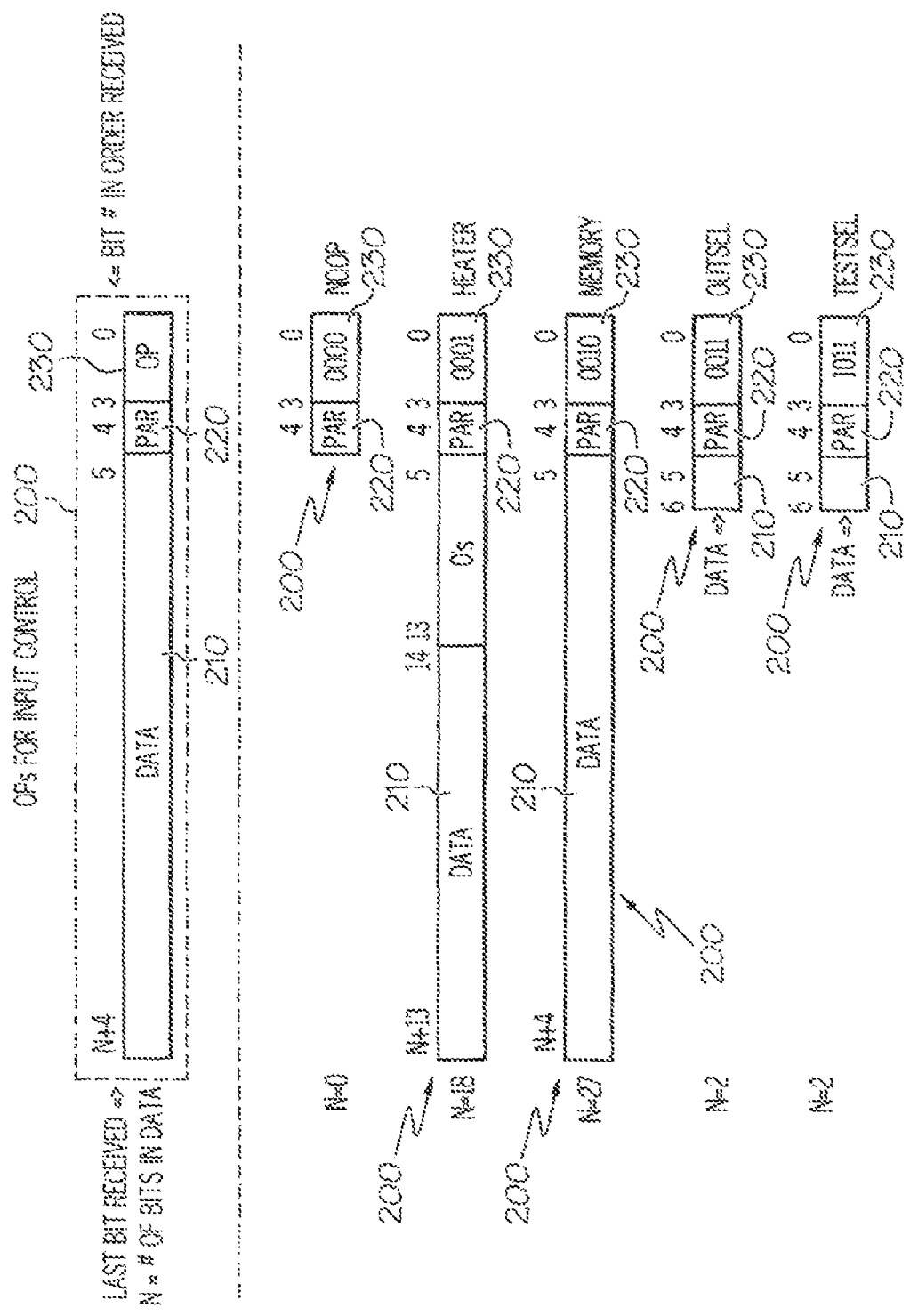
FIG. 5 is a representation of the instruction data provided to at least one data handling device and data controller in accordance with one illustrative embodiment of the present invention.

In FIG. 5, an illustrative embodiment of the instruction data 200 provided from integrated circuit 44 to the data handling devices and data controller 150 is shown. As indicated above, instruction data 200 may correspond to a carrier signal which provides instructions and/or information to each communicatively connected device. Although the instruction data 200 is illustrated in binary form, it should be understood that instruction data 200 is merely illustrative and that other forms of data are contemplated. The data may be transmitted according to various number systems (i.e., binary, decimal, hexadecimal, etc.) and/or according to various transmission formats (i.e., infrared signal, voltage signal, etc.). Furthermore, it should be understood that the organization of the data is exemplary and may differ according to the design or configuration into which it is implemented.

In one embodiment, instruction data 200 may comprise object data 210. In such an embodiment, object data may provide the primitive address sequence to the heater elements that is necessary to eject the proper ink droplets on a medium to create an object. As illustrated, the length of the object data

210 may correspond to the particular data handling device to which it is being sent. For instance, a heater register 130 may accommodate 18 bits of data and thus object data intended for the heater register 130 data may be 18 bits in length. Additionally, memory 110 may accommodate 27 bits of data and thus object data intended for the memory 110 may be 27 bits in length. Moreover, OUTSEL 120 may accommodate 2 bits of data and thus instruction data intended for the OUTSEL 120 may be 2 bits in length. Such differing lengths may optimize the modularity of the devices since each data handling device expects object data of a particular length and only such length is provided to the appropriate data handling device. Additionally, by tailoring the size of the object data to the particular device, "filler data" is not needed to provide a standard length of data for all data handling devices based upon the architecture (i.e., 32 bit system). Therefore, neither date handling devices added to the micro-fluid ejection device nor existing data handling devices need to be configured to conform to predetermined bit boundaries (i.e., 32 bit architecture).

In another embodiment, instruction data 200 may comprise parity data 220. In such an embodiment, parity data 220 may be an error indicator that provides error checking information to ensure the corresponding instruction data 200 is correct. As illustrated, the parity data 220 may be an odd parity bit to provide odd assertions within instruction data 200. For instance, if there are an even number of assertions (i.e., high signals, "1's", etc) within instruction data 200, the odd parity bit is asserted to provide an odd number of assertions in the instruction data 200. Conversely, if there are an odd number of assertions within instruction data 200, the odd parity bit is not asserted to maintain an odd number of assertions in the instruction data 200. Other embodiments are contemplated for parity data 220 such as an even parity bit, or a checksum.

In yet another embodiment, instruction data 200 may comprise address data 230. In such an embodiment, address data 230 may be provided within instruction data 200 to indicate the intended location of the data. For instance and as illustrated in FIG. 4, a particular address may correspond to a heater element, memory, OUTSEL, TESTSEL, NO-OP or the like. As illustrated, address data 230 may be four bits in length to provide addressing for up to sixteen devices. However, the configuration of the address may differ according to the number of devices addressed and/or the configuration of the control circuit 32.

In this exemplary embodiment, the instruction data 200 for the heater and memory is 32 bits long. However, it should be understood that instruction data 200 may be any length appropriate for a particular data handling device and is not bound by bit boundaries. In addition, the object data 210, the parity data 220 and the address data 230 may occupy any space within a particular instruction data length.

Figure 6:
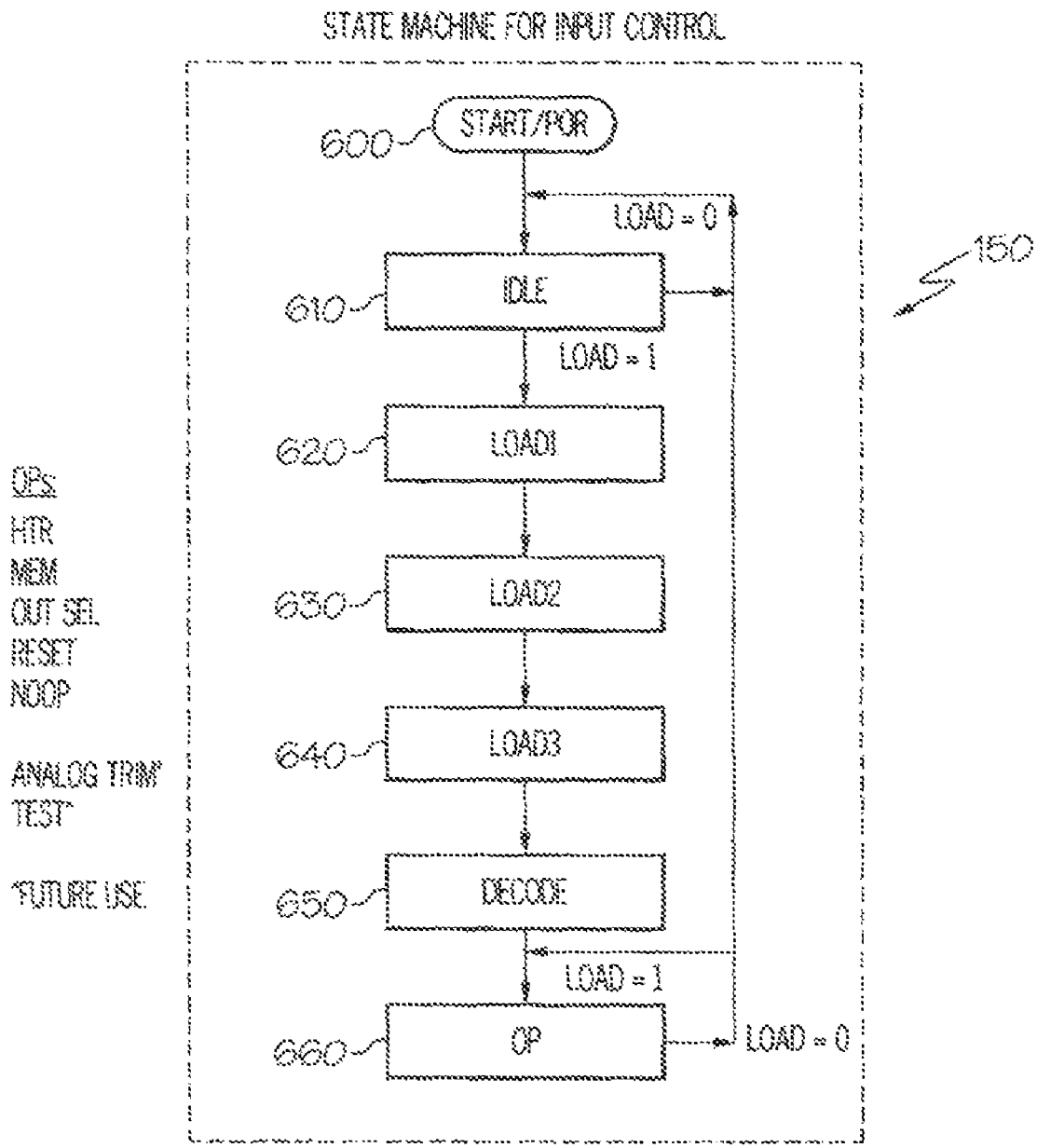
FIG. 6 is a flowchart depicting stages of the data controller in accordance with one illustrative embodiment of the present invention.

Focusing now on the embodiment illustrated in FIG. 6, the data controller 150 is illustrated as a block diagram to demonstrate various stages within the controller in accordance with one particular embodiment of the present invention. It should be understood that the data controller 150 may be comprised of devices commonly known in the art (such as flip-flops, logic gates, transistors or the like) to achieve the particular functionality described for data controller 150.

As illustrated in block 600, data controller 150 may be activated to begin control of the instruction data to the data handling devices. In one embodiment, data controller 150 may be activated when the micro-fluid ejection device is turned on. In another embodiment, data controller 150 may be activated when the integrated circuit 44 begins transmitting instruction data to the data handling devices and data controller 150. Activation of the data controller 150 may be achieved by transmitting a signal or any other method now known or hereafter developed for activating a device.

As illustrated in block 610, instruction data (i.e., address data) may be loaded into data controller 150 when a 'load' signal 160 (as shown in FIG. 3) is enabled. Typically, the 'load' signal is provided by the integrated circuit 44 to indicate an appropriate time to actuate a heater element 40. However, the 'load' signal may be provided by a microprocessor or any other device responsible to control the tiring of the heater elements. In one embodiment, individual bits of address data are loaded sequentially into data controller 150 (as shown by blocks 620, 630 and 640). When each address bit is loaded into the data controller 150, the controller 150 decodes the address data as described further herein. In such an embodiment and as illustrated, data controller 150 may comprise three load stages 620-640, such that data controller 150 may be operable to handle a four bit address in accordance with one embodiment of the instruction data 200 described above.

As illustrated in block 650, address data may be decoded by data controller 150 to determine an address for a particular data handling device implemented in the control circuit 32. In one embodiment, address data may be four bits in length such that each bit of the address data is a binary placeholder. Thus, in such an embodiment, at least sixteen possibilities may be decoded by data controller 150, each possibility unique to address at least one data handling device. It should be understood that the particular length of the address data may depend upon the amount of data handling devices addressed by data controller 150 (i.e., 5 address bits permit up to 32 data handling devices, 6 address bits permit up to 64 data handling devices, etc.). Consequently, it should also be understood that additional data controllers may be connected together (i.e., daisy chained in parallel or sequentially) to accommodate additional devices rather than adding load sequences (i.e. additional logic) to the data controller 150. Such daisy chaining may provide additional modularity when data handling devices are added. For example, the data controls can be coupled together in either a parallel or serial connection.

As illustrated in block 660, once the address data has been decoded to determine at least one addressed data handling device, data controller 150 may operate a data handling device according to the decoded address. In one embodiment and as described above, data controller 150 may enable a signal to the addressed data handling device(s) to allow the device data on data lines 125 and/or 135 to be input to the addressed data handling device. In such an embodiment and as illustrated in FIG. 3, if memory 110 is addressed, a 'mem_load' signal 170 may be enabled to input device data into memory 110; if OUTSEL 120 is addressed, an 'outsel_load' signal 180 may be enabled to input device data into OUTSEL 120; and if registers 130, 132, 140 and 142 are addressed, a 'htr_latch' signal 190 may be enabled to input device data into the registers 130, 132, 140 and 142. As further shown by block 660, the input of the data to the addressed data handling device may continue so long as the load signal is enabled to data controller 150.

In addition to the modularity provided by addressing the data handling devices and associated data, increased modularity is provided with the addition of the data controller 150 into the control circuit 32. For instance, since the 'load' signal is input to the data controller 150, there is no need to reconfigure the 'load' line for each new data handling device implemented. Additionally, a 'fire' signal is no longer needed to transmit the data through control circuit 32 because the data controller controls data flow instead of the multiple combinations of "load" and "fire".

To increase the modularity of micro-fluid ejection devices, data controller 150 may be implemented in at least one addressed micro-fluid ejection device. In such an embodiment, data controller(s) 150 may route device data to particular micro-fluid ejection devices in a manner similar to routing device data to the data handling devices described above. For instance, data controller 150 may receive instruction data and decode address data to determine the particular micro-fluid ejection device to which the device data is intended. The data controller 150 may enable the particular addressed micro-fluid ejection device to input the device data therein. In such an embodiment data controller 150 may be provided on the same substrate as the multiple micro-fluid ejection devices. However, other embodiments are contemplated whereby the data controller and multiple micro-fluid ejection devices are provided on different substrates.

The foregoing description of the various embodiments of the invention has been presented for the purposes of illustration and description. It is not intended to be exhaustive or to limit the Inventions to the precise forms disclosed. Many alternatives, modifications and variations will be apparent to those skilled in the art of the above teaching. Accordingly, while some of the alternative embodiments of the system for improving modularity in a micro-fluid ejection device have been discussed specifically, other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

What is claimed is:

1. A micro-fluid ejection device configured for ejecting one or more ink droplets to an object comprising:
   a power circuit;
   at least one heater element for ejecting the one or more ink droplets to an object; and
   a control circuit comprising:
      a plurality of addressable data handling devices configured to receive instruction data, the instruction data comprising device data and an address associated with at least one data handling device destination of the device data; and
      at least one data controller configured to be programmed with addresses of the plurality of addressable data handling devices and operative to receive the instruction data, separate the address from the device data, determine the at least one data handling device destination of the device data based upon the address, and transmit an enabling signal to said at least one data handling device destination associated with the address to allow a selected data handling device at the at least one data handling device destination to input the device data upon enablement.

2. The device as recited in claim 1, wherein the data controller selects the at least one data handling device destination based upon a signal received from an integrated circuit.

3. The device as recited in claim 1, wherein the at least one data controller receives the instruction data when a load signal is enabled.

4. The device as recited in claim 1, wherein each of the addressable data handling devices is configured to accommodate a corresponding bit length of device data such that the at least one data controller receives instruction data of multiple bit lengths depending on the bit length of the device data for a corresponding data handling device destination.

5. The device as recited in claim 1, wherein the instruction data includes parity data, and wherein the data controller monitors such parity data, and is configured to generate an error signal in the event of a parity error.

6. The device as recited in claim 1, wherein at least one of the plurality of addressable data handling devices is a memory device.

7. The device as recited in claim 1, further comprising a second micro-fluid ejection device comprising a second data controller wherein the micro-fluid ejection devices are addressed and the data controllers are operative to decode an address from the instruction data and select at least one micro-fluid ejection device to receive device data from the instruction data based upon the decoded address.

8. The device as recited in claim 1, further comprising a plurality of micro-fluid ejection devices, each comprising a data controller wherein the micro-fluid ejection devices are addressed and the data controllers are operative to decode an address from the instruction data and select at least one micro-fluid ejection device to receive device data from the instruction data based upon the decoded address.

9. The device as recited in claim 8, wherein the plurality of micro-fluid ejection devices are contained on a printhead.

10. The device as recited in claim 8, wherein the plurality of micro-fluid ejection devices are contained on a plurality of printheads.

11. The device as recited in claim 1, further comprising a second data controller coupled to the at least one data controller to accommodate additional data handling devices.

* * * * *